United States Patent
Miyazaki et al.

(10) Patent No.: US 9,377,771 B2
(45) Date of Patent: Jun. 28, 2016

(54) NUMERICAL CONTROLLER FOR COMMUNICATION WITH I/O UNITS

(71) Applicant: FANUC Corporation, Minamitsuru-gun, Yamanashi (JP)

(72) Inventors: Yoshito Miyazaki, Minamitsuru-gun (JP); Hiroshige Ando, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 543 days.

(21) Appl. No.: 13/944,920

(22) Filed: Jul. 18, 2013

(65) Prior Publication Data

US 2014/0025185 A1    Jan. 23, 2014

(30) Foreign Application Priority Data

Jul. 23, 2012  (JP) ................... 2012-162339

(51) Int. Cl.
| | | |
|---|---|---|
| *G05B 19/18* | (2006.01) | |
| *G06F 19/00* | (2011.01) | |
| *G06F 3/00* | (2006.01) | |
| *G06F 13/00* | (2006.01) | |
| *H04B 1/38* | (2015.01) | |
| *H04L 5/16* | (2006.01) | |
| *G05B 19/414* | (2006.01) | |

(52) U.S. Cl.
CPC .............. *G05B 19/18* (2013.01); *G05B 19/414* (2013.01)

(58) Field of Classification Search
USPC ........................................................ 702/168
See application file for complete search history.

(56) References Cited

U.S. PATENT DOCUMENTS

| | | | | |
|---|---|---|---|---|
| 5,555,548 A | * | 9/1996 | Iwai | H04J 3/0638 375/356 |
| 6,430,218 B1 | | 8/2002 | Mito | |
| 7,254,460 B1 | * | 8/2007 | Higashi | G05B 19/4142 318/85 |
| 2008/0189445 A1 | * | 8/2008 | Hada | G05B 19/042 710/10 |
| 2008/0294805 A1 | * | 11/2008 | Sone | G05B 19/058 710/19 |
| 2012/0072629 A1 | * | 3/2012 | Tokuda | G06F 13/364 710/110 |

FOREIGN PATENT DOCUMENTS

| | | |
|---|---|---|
| CN | 101170472 A | 4/2008 |
| DE | 19756918 B4 | 12/2005 |
| EP | 2502789 A1 | 9/2012 |
| JP | 2004289754 A | 10/2004 |
| JP | 2005025545 A | 1/2005 |
| JP | 2005318191 A | 11/2005 |
| WO | WO-2011062128 A1 | 5/2011 |

OTHER PUBLICATIONS

Office Action issued Dec. 2, 2015 in German Patent Application No. 10 2013 011 850.6 (6 pages) with an English Translation (6 pages).

* cited by examiner

*Primary Examiner* — Mohammad Ali
*Assistant Examiner* — Md Azad
(74) *Attorney, Agent, or Firm* — Drinker Biddle & Reath LLP (57) ABSTRACT

A numerical controller is chain-connected with a plurality of I/O units so that it transmits DI/DO signals to and receives DI/DO signals from the I/O units by master-slave communication. The numerical controller counts signals generated by a timer circuit up to a predetermined number and sets, from among the plurality of I/O units, an I/O unit with which transfer of the DI/DO signals is to be performed for each count value. The DI/DO signals of the set I/O units are transferred according to the count value.

1 Claim, 8 Drawing Sheets

■ ADDRESS PART OF HEADER FIELD 31 (CASE OF 16 BITS)

ADDRESS NO.15 ⟵⟶ ADDRESS NO.0

■HEADER FIELD 32 FOR ABOVE ADDRESS

FIG.5

| | ADDRESS PART OF HEADER FIELD (16 BITS) | DATA FIELD | | | | FOOTER FIELD (CRC, ETC.) |
|---|---|---|---|---|---|---|
| PERIOD 1 | 0000 0000 0000 1111 | $S_A$ ADDRESS NO.0 DATA 21 | $S_A$ ADDRESS NO.1 DATA 22 | $S_A$ ADDRESS NO.2 DATA 23 | $S_A$ ADDRESS NO.3 DATA 24 | |
| PERIOD 2 | 0000 0000 0011 1111 | $S_A$ ADDRESS NO.0 DATA 21 | $S_A$ ADDRESS NO.1 DATA 22 | $S_A$ ADDRESS NO.2 DATA 23 | $S_A$ ADDRESS NO.3 DATA 24 | |
| PERIOD 3 | 0000 0000 1100 0011 | $S_A$ ADDRESS NO.0 DATA 21 | $S_A$ ADDRESS NO.1 DATA 22 | $S_A$ ADDRESS NO.2 DATA 23 | $S_A$ ADDRESS NO.3 DATA 24 | |
| PERIOD 4 | 0000 0011 0000 0011 | $S_A$ ADDRESS NO.0 DATA 21 | $S_A$ ADDRESS NO.1 DATA 22 | $S_A$ ADDRESS NO.2 DATA 23 | $S_A$ ADDRESS NO.3 DATA 24 | |
| PERIOD 5 | 0000 0000 0000 1111 | $S_A$ ADDRESS NO.0 DATA 21 | $S_A$ ADDRESS NO.1 DATA 22 | $S_A$ ADDRESS NO.2 DATA 23 | $S_A$ ADDRESS NO.3 DATA 24 | |
| ⋮ | | | | | | |

FIG.8

ORDER OF TRANSFER IN SAME PERIOD (0.5 ms) →

| COUNTER 1 | I/O UNIT (1) | I/O UNIT (2) | I/O UNIT (6) | I/O UNIT (13) | I/O UNIT (17) |
|---|---|---|---|---|---|
| COUNTER 2 | I/O UNIT (1) | I/O UNIT (3) | I/O UNIT (7) | I/O UNIT (12) | I/O UNIT (16) |
| COUNTER 3 | I/O UNIT (1) | I/O UNIT (4) | I/O UNIT (8) | I/O UNIT (11) | I/O UNIT (15) |
| COUNTER 4 | I/O UNIT (1) | I/O UNIT (5) | I/O UNIT (9) | I/O UNIT (10) | I/O UNIT (14) |

NUMERICAL CONTROLLER FOR COMMUNICATION WITH I/O UNITS

RELATED APPLICATION DATA

This application claims priority under 35 U.S.C. §119 and/or §365 to Japanese Application No. 2012-162339 filed Jul. 23, 2012, the entire contents is incorporated herein by reference.

BACKGROUND OF THE INVENTION

1. Field of the Invention

The present invention relates to a numerical controller (CNC) configured to communicate with a plurality of external signal input/output units (I/O units) that are connected so as to perform input and output of DI/DO signals (input/output signals) between the numerical controller and a machine tool.

2. Description of the Related Art

Figure 1:
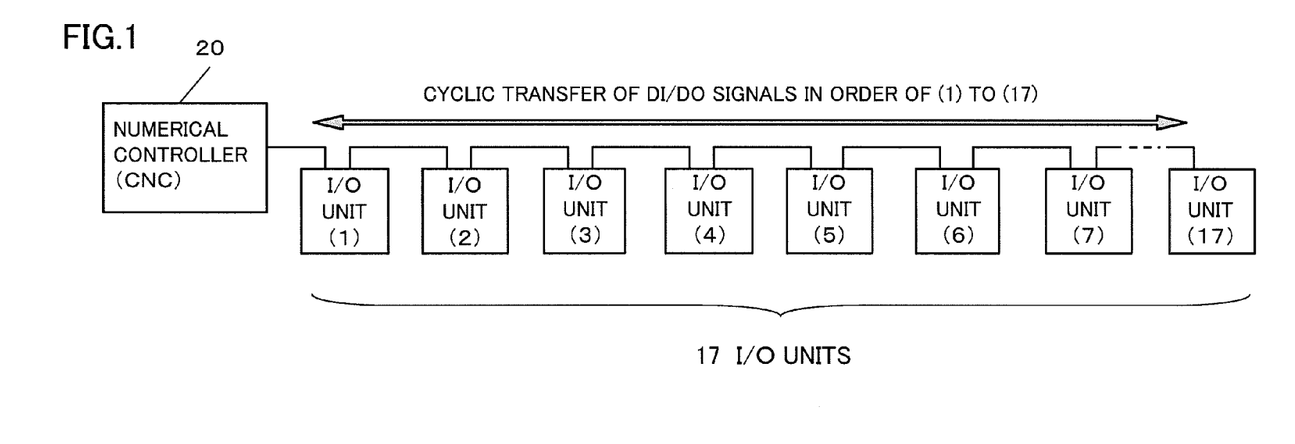
FIG. 1 is a diagram illustrating a configuration in which a numerical controller and 17 I/O units are chain-connected.
Figure 2:
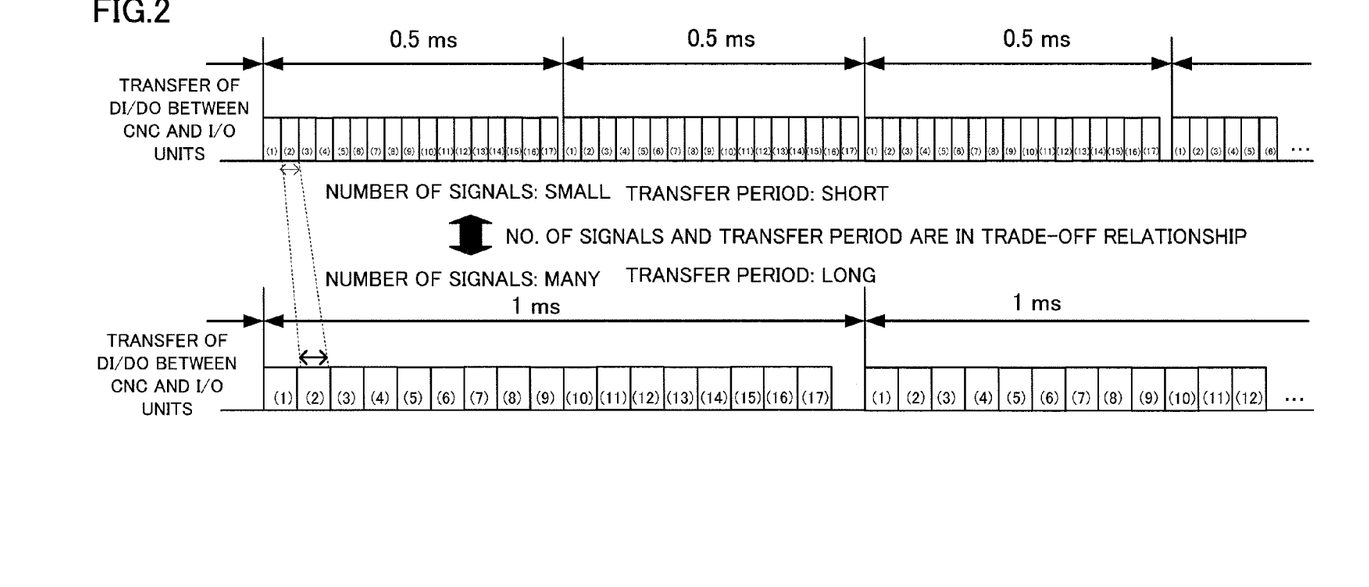
FIG. 2 is a diagram illustrating chain-connected master-slave communication between the numerical controller and the I/O units shown in FIG. 1.

To perform input and output of DI/DO signals between a numerical controller (CNC) and a machine tool, a plurality of external signal input/output (I/O) units for use as slaves are connected to the numerical controller (see FIG. 1). In this case, the numerical controller serves as a master, and the I/O units serves as slaves. Normally, DI/DO signals are transferred between the numerical controller and the I/O units. Since the numerical controller is expected to perform predetermined processing within a predetermined time, the transfer period of these DI/DO signals should preferably be fixed. In many cases, therefore, signals are transferred to all the I/O units in a fixed-period, time-sharing manner (see FIG. 2).

Japanese Patent Application Laid-Open No. 2005-25545 discloses a technique in which a master and a plurality of I/O units are connected by one or more communication lines.

Figure 3:
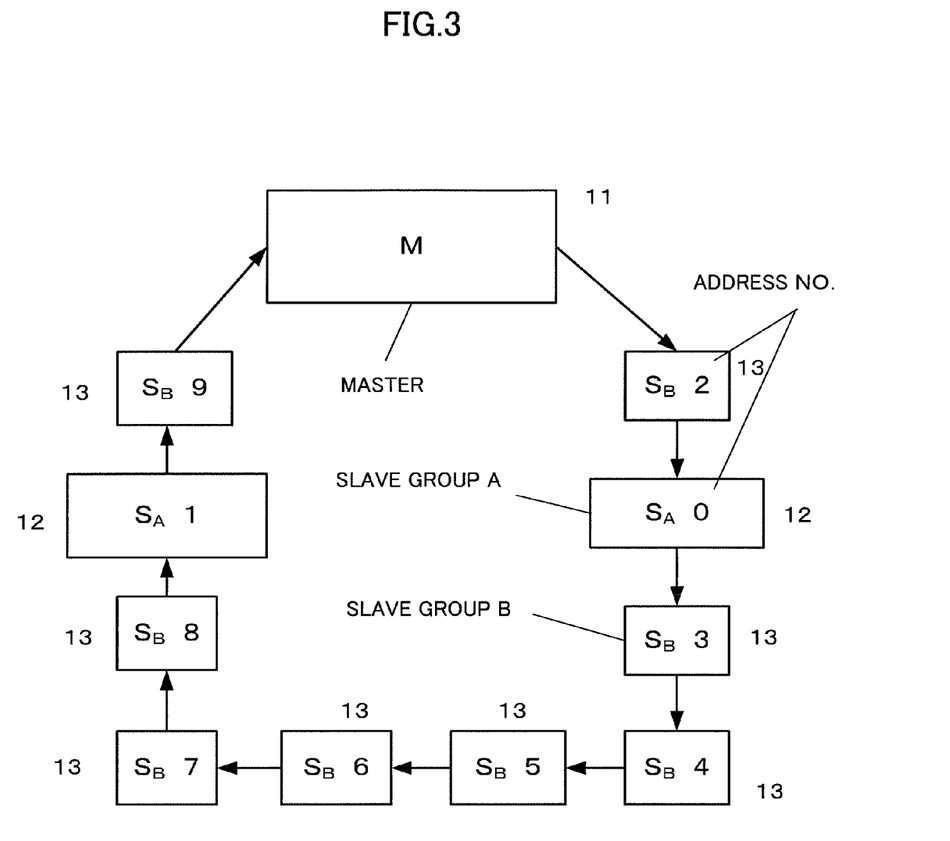
FIG. 3 is a diagram illustrating prior art daisy-chain connection for serial communication.
Figure 4:
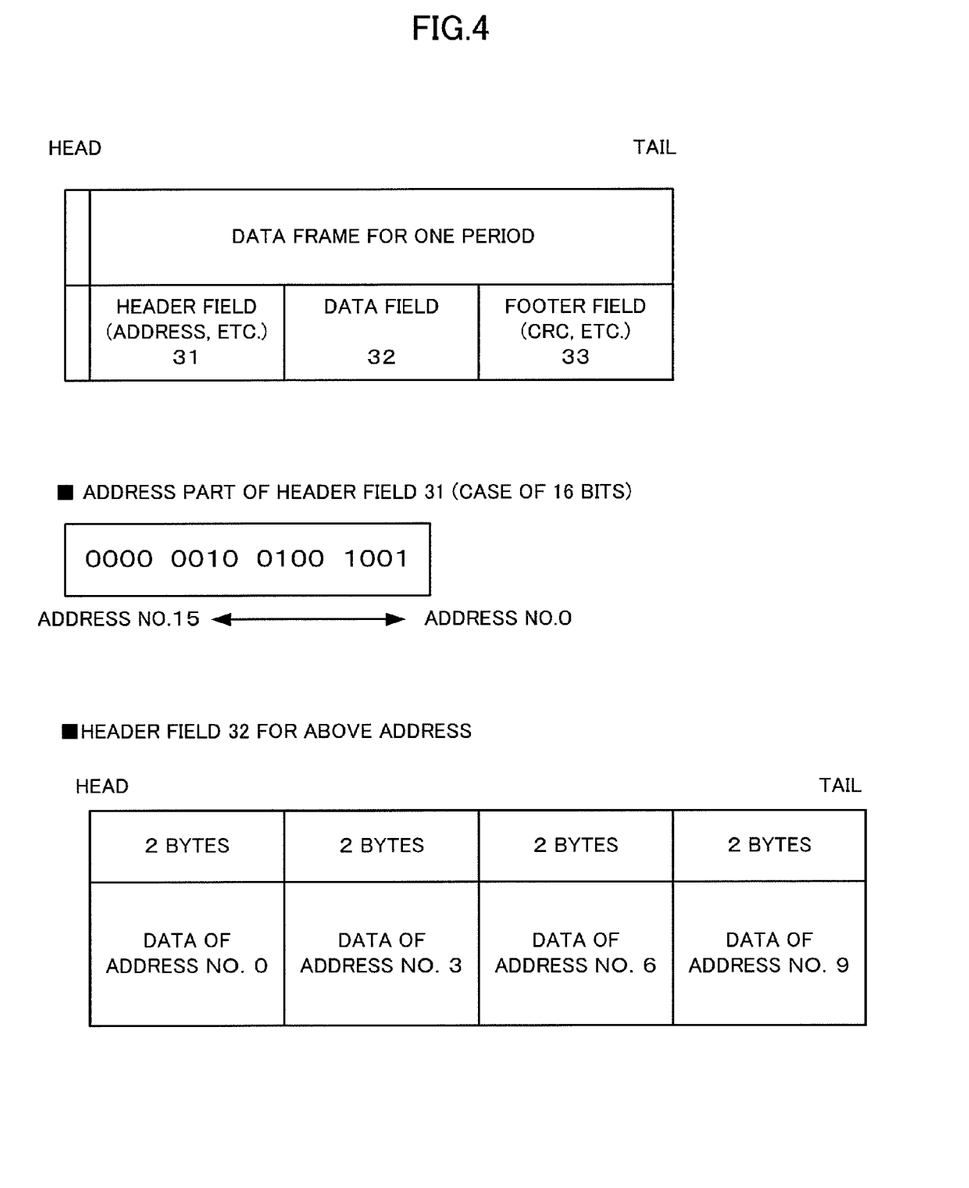
FIG. 4 is a diagram showing a prior art data frame for one period.
Figure 5:
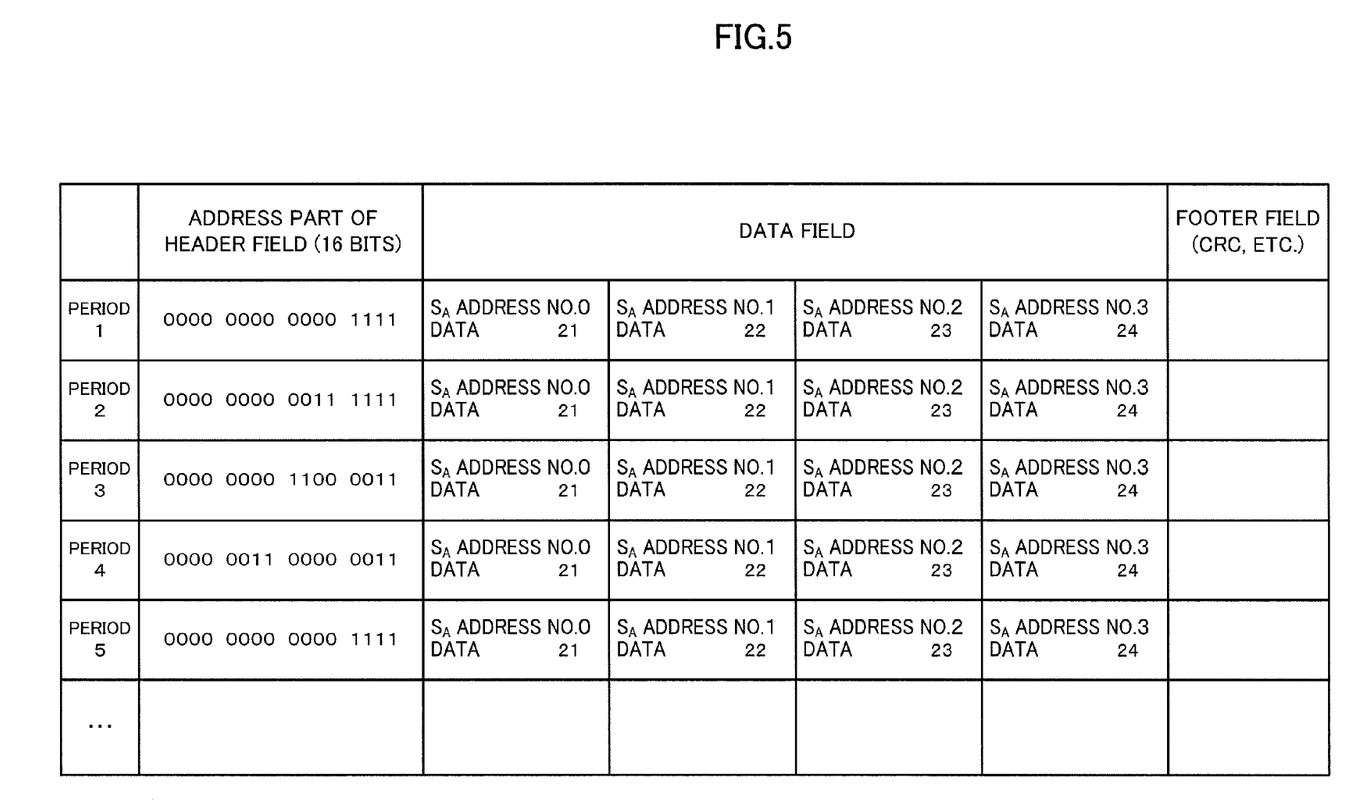
FIG. 5 is a data diagram showing a prior art data frame to which address areas are added.

Further, as shown in FIG. 3, Japanese Patent Application Laid-Open No. 2004-289754 discloses a method of constructing a data frame for serial communication, in which a single master 11, a group A 12 of slaves that requires an early data updating and a group B 13 of slaves that allows a late data updating are connected on the same communication loop for cyclic data transfer. The period of serial communication is adjusted to a data updating rate necessary for the slave group A 12, and data updating of the slave group B 13 is performed in a period equal to an integral multiple of the period of serial communication. Further, as shown in FIG. 4 and FIG. 5, a single data field 32 is formed by coupling command data transmitted from the master to parts of the slave group A 12 and the slave group B 13 within a single period. Also, a single data field is formed by coupling response data returned to the master. A header field 31 which represents address of each of the slaves concerned in bits is added to the head of the data field 32, and the data 21 to 24 of slaves indicated by this address area are coupled in a predetermined order. Thus, the slave data included in the data field can be extracted by using only configuration of the address area having a bit length of header field 31.

In the case where signals are transferred in a fixed-period, time-sharing manner by one-on-one communication between a master and slaves that are chain-connected (master-slave communication), the transfer period and the number of signals are in a trade-off relationship. Specifically, transfer period has to be extended in order to increase the number of signals beyond the transfer capability, as a result, the responsiveness is inevitably reduced. If the transfer period is shortened for the preference of the signal response, in contrast, the number of signals is inevitably reduced (see FIG. 2) (see above-mentioned Japanese Patent Application Laid-Open No. 2005-25545, see FIG. 2).

Figure 6:
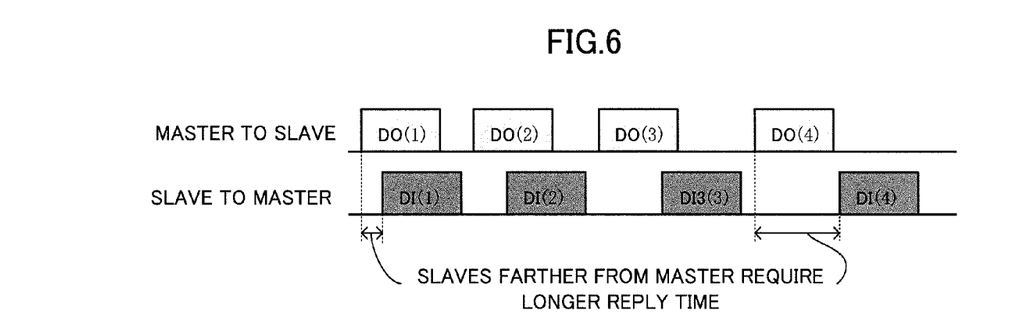
FIG. 6 is a diagram illustrating how slaves located farther from a master require longer reply times in the chain-connected master-slave communication.

A technique for solving the above-mentioned problem of Japanese Patent Application Laid-Open No. 2005-25545 is disclosed in Japanese Patent Application Laid-Open No. 2004-289754. Since the technique disclosed in Japanese Patent Application Laid-Open No. 2004-289754 relates how to solve problems of broadcast communication (broadcast transmission) based on the loop-coupling method, however, it cannot be directly applied to one-on-one communication between a master and slaves (master-slave communication) based on chain-connection. In the master-slave communication, in particular, slaves located farther from the master generally require longer reply times (see FIG. 6). Therefore, there is a problem that more frequent communication with slaves farther from the master results in longer waiting times for replies and waste of a bandwidth. The technique disclosed in Japanese Patent Application Laid-Open No. 2004-289754 cannot solve this problem (see FIG. 7).

SUMMARY OF THE INVENTION

Accordingly, the object of the present invention is to provide a numerical controller for communication with I/O units, capable of solving the problems that tend to occur in case where slaves located farther from a master require longer reply times and more frequent communication with farther slaves results in longer waiting times for replies and waste of a bandwidth.

A numerical controller according to the present invention is configured to communicate with a plurality of I/O units and is chain-connected with the I/O units so that it transmits DI/DO signals to and receives DI/DO signals from the I/O units by master-slave communication. The numerical controller comprises: a timer circuit configured to generate a signal every predetermined period; a counter unit configured to count the number of signals generated by the timer circuit up to a predetermined number; and an I/O unit transfer order setting unit configured to set, from among the plurality of I/O units, an I/O unit with which transfer of the DI/DO signals is to be performed for each count value of the counter unit. The DI/DO signals of the I/O units set in the I/O unit transfer order setting unit are transferred according to the count value of the counter unit.

The numerical controller may further comprise an I/O unit transfer period group setting unit configured to divide the I/O units into groups according to the transfer period of the DI/DO signals, and an automatic setting unit configured to automatically perform the setting of the I/O unit transfer order setting unit, based on contents set by the I/O unit transfer period group setting unit.

Information set in the I/O unit transfer period group setting unit may comprise order information of the I/O units according to a distance from the numerical controller, and the automatic setting unit may set the I/O units to which the DI/DO signals are transferred in the I/O unit transfer order setting unit, based on the order information.

According to the present invention, there may be provided a numerical controller for communication with I/O units, capable of solving the problems that tend to occur in case where slaves located farther from a master require longer reply times and more frequent communication with farther slaves results in longer waiting times for replies and waste of a bandwidth.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Figure 8:
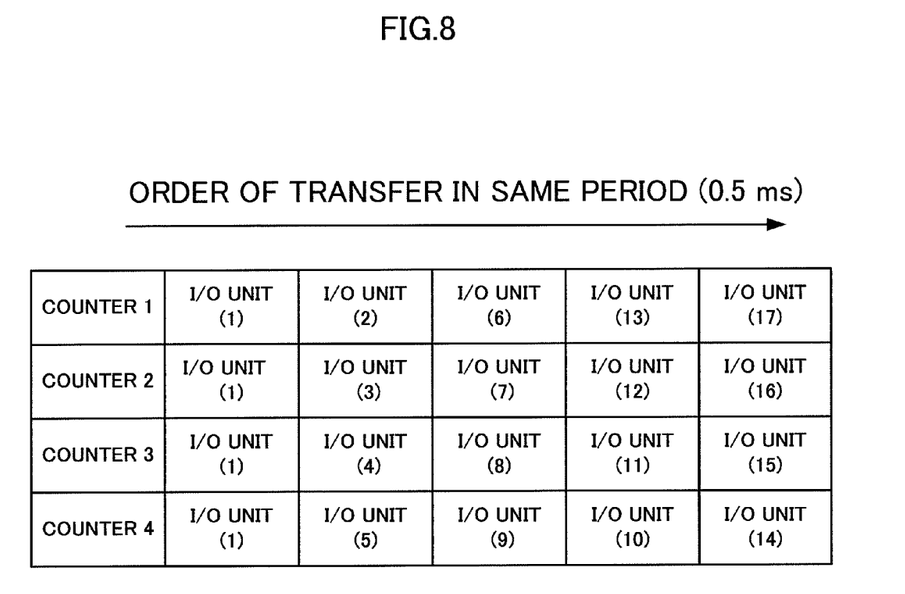
FIG. 8 is a diagram illustrating how I/O units located near and far from a numerical controller are combined for setting for each transfer period in transferring signals in master-slave communication with the numerical controller and the I/O units chain-connected.
Figure 9:
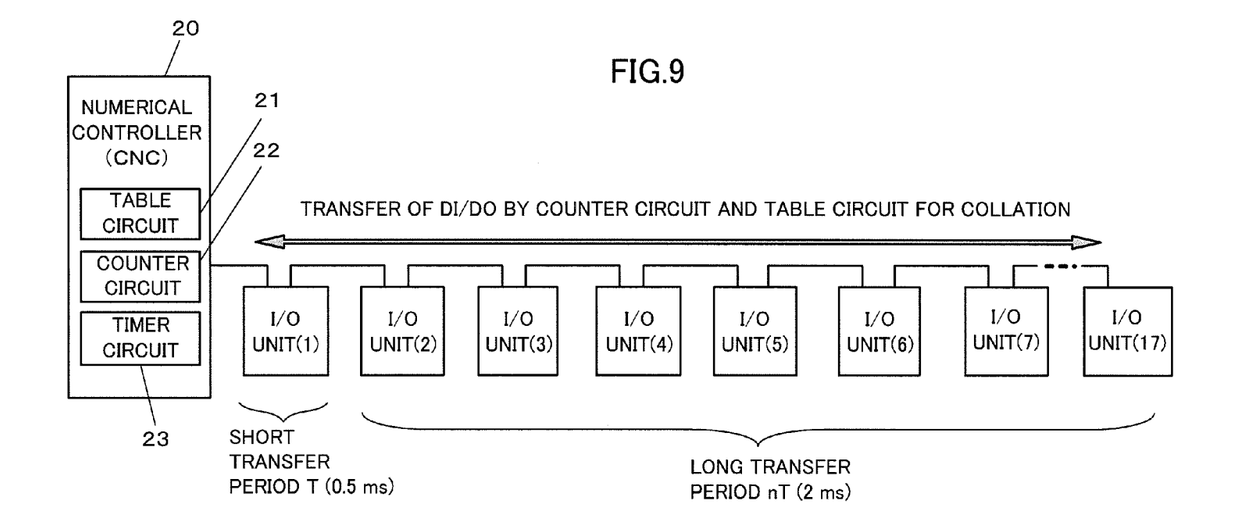
FIG. 9 is a diagram illustrating an embodiment of the numerical controller for communication with I/O units according to the present invention.
Figure 10:
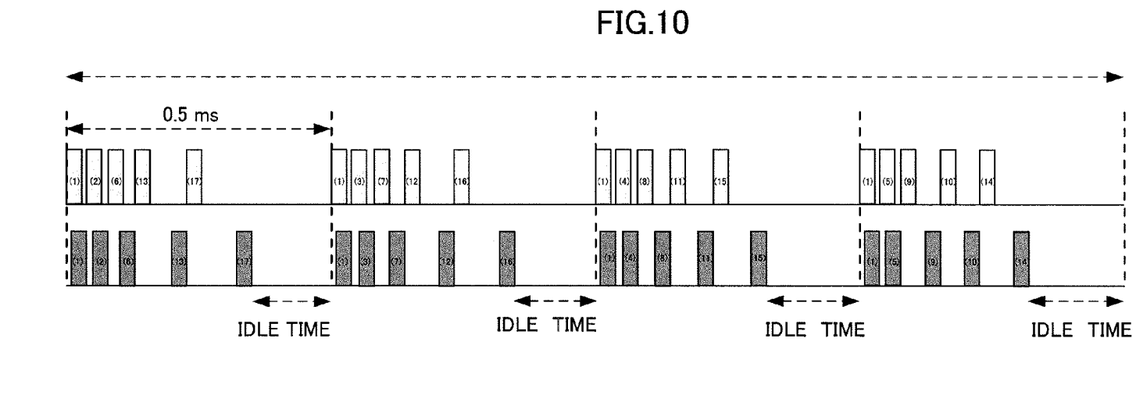
FIG. 10 is a diagram illustrating chain-connected master-slave communication between the numerical controller and the I/O units shown in FIG. 9.
Figure 11:
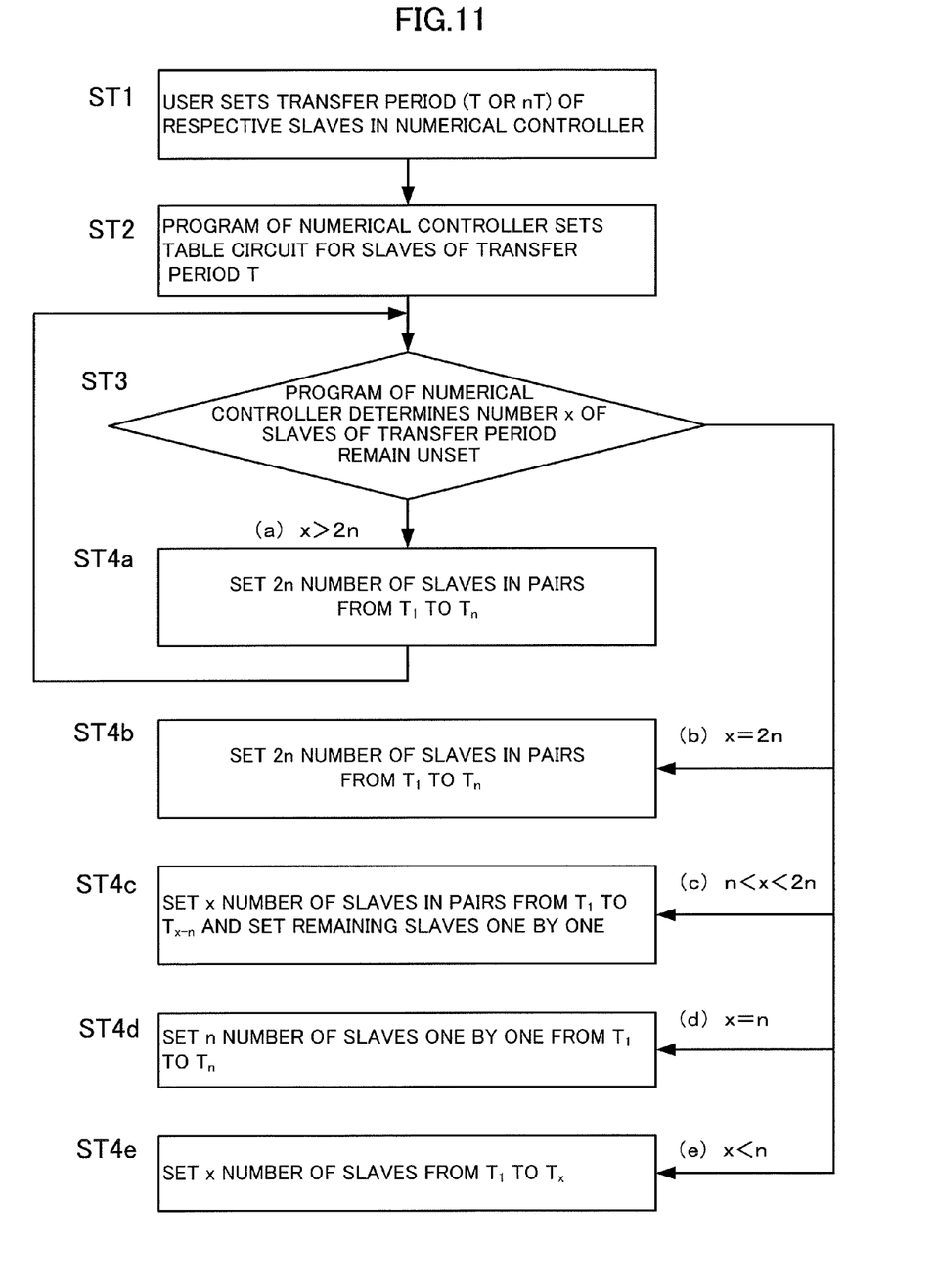
FIG. 11 is a flowchart illustrating processing performed by the numerical controller of FIG. 9.

FIG. 8 is a diagram illustrating how I/O units located near and far from a numerical controller are combined for setting for each transfer period in transferring signals in master-slave communication with the numerical controller and the I/O units chain-connected. FIG. 9 is a diagram illustrating an embodiment of the present invention. FIG. 10 is a diagram illustrating chain-connected master-slave communication between the numerical controller and the I/O units shown in FIG. 9. FIG. 11 is a flowchart illustrating processing of the numerical controller of the present invention.

First, user divides I/O units (1 to 17), connected to the numerical controller 20a which controls a machine tool (not shown), into two groups, a group of slaves for DI/DO signals with higher responsiveness required and a group of slaves for DI/DO signals with lower responsiveness required, and then sets the result of such division of the I/O units in a table circuit 21 of a numerical controller (CNC) 20.

The numerical controller 20 comprises a timer circuit 23, a counter circuit 22, and the table circuit 21. The timer circuit 23 generates signals of period T. The counter circuit 22 counts the number of times of transfer of the DI/DO signals performed up to n number of times. The table circuit 21 can set a specific I/O unit with which transfer of signal is to be performed according to the count value of the counter circuit 22. The numerical controller 20 obtains the count values of the counter circuit 22, using the signals of period T output from the timer circuit 23 as triggers, and collates the obtained count value with the table circuit 21. By doing this, the numerical controller 20 can specify the I/O unit with which transfer of signal is to be performed such that transfer of signal is performed between the numerical controller 20 and the I/O unit.

A program in a storage device (not shown) of the numerical controller 20 sets the table circuit 21 in the following manner in response to a user's setting.

According to the setting method of the table circuit 21, the table circuit 21 is first set so that signals are transferred, for all the count values (1 to n) in the counter circuit 22, to the I/O units of short transfer period T. Then, from among other remaining I/O units of long transfer period nT, an I/O unit nearest to the numerical controller 20 and an I/O unit farthest from the numerical controller 20 are combined and then the count value of the counter circuit 22 with which transfer of signals is to be performed are assigned to such combination of the I/O units.

Figure 7:
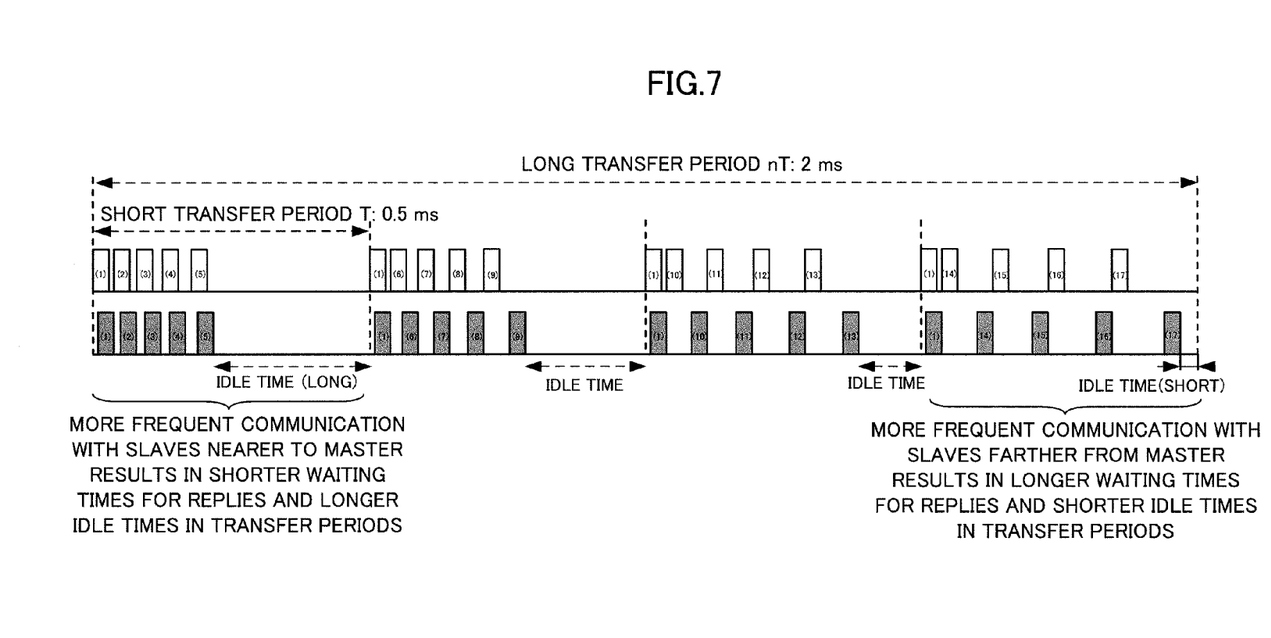
FIG. 7 is a diagram illustrating that more frequent communication with slaves nearer to the master results in longer idle times in transfer periods and that more frequent communication with slaves farther from the master results in shorter idle times in the transfer periods.

The setting method will now be described with reference to FIG. 7. In case where signals are transferred with short transfer period T (T=0.5 ms) only to I/O unit 1, from among 17 I/O units (identified by serial numbers 1 to 17), whereas signals are transferred with long transfer period nT (nT=2 ms) to the remaining I/O units 2 to 17, for example, then setting is made such that signals be transferred to I/O unit 1 with each of the count values 1 to 4 of the counter circuit 22.

On the other hand, for the remaining I/O units 2 to 17, setting is made such that signals be transferred to (or communication is made with) both of the I/O unit 2 nearest to the numerical controller 20 and unit 17 farthest from the numerical controller 20 when the count value of the counter circuit 22 is 1. Here, whether any one of the I/O units 1 to 17 is 'near' to or 'far' from the numerical controller 20 is determined by the order of connection of the I/O unit to the numerical controller 20 on a chain-connected line.

Then, for the remaining I/O units 3 to 16, setting is made such that the I/O units 3 and 16, which are located nearest to and farthest from the numerical controller 20, are transferred when the count value of the counter circuit 22 is 2. In this way, setting is made such that, from among remaining I/O units, an I/O unit nearest to the numerical controller 20 and an I/O unit farthest from the numerical controller 20 be combined, and any one of the counter values (1 to 4) of the counter circuit 22 is assigned to such combination of the I/O units, while the counter value of the counter circuit 22 which is to be assigned to the combination of I/O units is increased one by one but returns to 1 after the counter value reaches 4. Such setting processing is repeated until any of the counter values of the counter circuit 22 is assigned to all of the I/O units. By this setting, an I/O unit farthest from the numerical controller 20 and an I/O unit nearest to the numerical controller 20 are combined and the same transfer period is set to (or the same transfer section is assigned) to such combined I/O units.

According to the method for setting the timing for transfer between the numerical controller 20 and the respective I/O units, as shown in FIG. 8:

I/O units with which transfer of signal is performed in a transfer section (with a short transfer period) where the count value of the counter circuit 22 is 1 are I/O units 1, 2, 6, 13 and 17;

I/O units with which transfer of signal is performed in a transfer section (with a short transfer period) where the count value of the counter circuit 22 is 2 are I/O units 1, 3, 7, 12 and 16;

I/O units with which transfer of signal is performed in a transfer section (with a short transfer period) where the count value of the counter circuit 22 is 3 are I/O units 1, 4, 8, 11 and 15; and I/O units with which transfer of signal is performed in a transfer section (with a short transfer period) where the count value of the counter circuit 22 is 4 are I/O units 1, 5, 9, 10 and 14.

If setting is made such that a short transfer period T (0.5 ms) be applied only to I/O unit 1 while a long transfer period nT (2 ms) be applied to the other I/O units, as described before, then I/O unit 2 and I/O unit 17, I/O unit 3 and I/O unit 16, I/O unit 4 and I/O unit 16, are combined together. That is, an I/O unit that requires longer time for replying to the numerical controller 20 and an I/O unit that requires shorter time for replying to the numerical controller 20 are individually combined, as a result, idle times in the transfer periods are averaged. As the idle times are thus averaged, the number of signals of I/O units of short transfer period and an event-driven communication can be added without waste (see FIG. 10).

The examples described above with reference to FIGS. 8, 9 and 10, in which signals are transferred between the numerical controller and a plurality of I/O units that are chain-connected for master-slave communication, will be generalized and described below with reference to FIG. 11, where the numerical controller 20 is a master and the I/O units are slaves.

Short transfer period is denoted by T and long transfer periods is denoted by nT. The Long transfer period nT comprises n number of transfer sections $T_1, T_2, \ldots, T_n$ of short transfer period T (the time duration of the transfer sections $T_1$ to $T_n$ is equal to transfer period T) and is given by $nT = T_1 + T_2 + \ldots T_n$. The number of slaves is set to m, and these individual slaves are represented by $S_1, S_2, \ldots, S_m$ according to the distance from (how close to) the master. A set of all the slaves is given by $\{S_1, S_2, \ldots, S_m\}$.

(Step ST1)

The user sets, for each of the slaves $S_1, S_2, \ldots, S_m$, a transfer period with which signals are transferred, either short transfer period T or long transfer period nT, to the numerical controller 20 (master). Here, (m−x) number of slaves that are set by the user such that signals are transferred with the short transfer period T are given by $\{S_{\alpha 1}, S_{\alpha 2}, \ldots, S_{\alpha m-x}\}$, while x number of slaves that are set such that signals are transferred with long transfer period nT are given by $\{S_{\xi 1}, S_{\xi 2}, \ldots, S_{\xi x}\}$. Here, $\{S_1, S_2, \ldots, S_m\} = \{S_{\alpha 1}, S_{\alpha 2}, \ldots, S_{\alpha m-x}\} + \{S_{\xi 1}, S_{\xi 2}, \ldots, S_{\xi x}\}$. The slaves $S_{\xi 1}, S_{\xi 2}, \ldots, S_{\xi x}$ are arranged in the order named according to the distance from (how close to) the master.

In Step ST1, these slaves are divided into two groups, a group of slaves with which transfer of signal is set to be performed in a short transfer period and a group of slaves with which transfer of signal is set to be performed with a long transfer period, that is, these I/O units are classified into groups according to their transfer periods of DI/DO signals. The processing in Step ST1 is performed by an "I/O unit transfer period group setting unit" in the numerical controller according to the present invention. The "I/O unit transfer period group setting unit" comprises information of x number of slaves $\{S_{\xi 1}, S_{\xi 2}, \ldots, S_{\xi x}\}$ with which transfer of signal is set to be performed with a long transfer period and which are arranged in the order named according to the distance from the master (that is, information of I/O unit orders based on the distance from the numerical controller).

(Step ST2)

The program of the numerical controller 20 sets the table circuit 21 in the numerical controller so that the slaves $\{S_{\alpha 1}, S_{\alpha 2}, \ldots, S_{\alpha m-x}\}$ of short transfer period T are transferred in each of transfer sections $\{T_1, T_2, \ldots, T_n\}$.

(Step ST3)

The program of the numerical controller 20 determines under which of the following categories the number x of the slaves $\{S_{\xi 1}, S_{\xi 2}, \ldots, S_{\xi x}\}$ of long transfer period nT that have not yet been set in the table circuit 21 falls, (a) x>2n,
(b) x=2n,
(c) n<x<2n,
(d) x=n, or
(e) x<n.

Based on this determination result, the process proceeds to any one of the following Steps ST4a to ST4e.

(Step ST4a)

(a) In the case of x>2n, the program of the numerical controller 20 first sets the table circuit 21 in the numerical controller so that slaves $S_{\xi 1}$ and $S_{\xi x}$ perform transfer of signals in the transfer section $T_1$. Then, the program sets the table circuit 21 so that slaves $S_{\xi 2}$ and $S_{\xi x-1}$ perform transfer of signals in the transfer section $T_2$. Subsequently, moreover, the program sets the table circuit 21 so that slaves $S_{\xi 3}$ and $S_{\xi x-2}$ perform transfer of signals in the transfer section $T_2$. If these setting operations are sequentially repeated up to the transfer section $T_n$, (x−2n) number of slaves remain unset in the table circuit 21. A set of the remaining slaves $\{S_{\xi n+1}, S_{\xi n+2}, \ldots, S_{\xi x-n}\}$ is renewed to $\{S_{\xi 1}, S_{\xi 2}, \ldots, S_{\xi x}\}$, whereupon the program returns to Step ST3.

(Step ST4b)

(b) In the case of x>2n, the program of the numerical controller 20 first sets the table circuit 21 in the numerical controller so that slaves $S_{\xi 1}$ and $S_{\xi x}$ perform transfer of signals in the transfer section $T_1$. Then, the program sets the table circuit 21 so that slaves $S_{\xi 2}$ and $S_{\xi x-1}$ perform transfer of signals in the transfer section $T_2$. Subsequently, moreover, the program sets the table circuit 21 so that slaves $S_{\xi 3}$ and $S_{\xi x-2}$ perform transfer of signals in the transfer section $T_2$. If these setting operations are sequentially repeated up to the transfer section $T_n$, all the slaves of $\{S_1, S_2, \ldots, S_m\}$ are set in the table circuit 21.

(Step ST4c)

(c) In the case of n<x<2n, the program of the numerical controller 20 first sets the table circuit 21 in the numerical controller so that slaves $S_{\xi 1}$ and $S_{\xi x}$ perform transfer of signals in the transfer section $T_1$. Then, the program sets the table circuit 21 so that slaves $S_{\xi 2}$ and $S_{\xi x-1}$ perform transfer of signals in the transfer section $T_2$. Subsequently, moreover, the program sets the table circuit 21 so that slaves $S_{\xi 3}$ and $S_{\xi x-2}$ perform transfer of signals in the transfer section $T_2$. If these setting operations are sequentially repeated up to the transfer section $T_{x-n}$, (x−n) number of slaves remain unset in the table circuit 21. Thereupon, if the program sequentially sets the table circuit 21 so that the signals are transferred in transfer sections $\{T_{x-n+1}, T_{x-n+2}, \ldots, T_n\}$ for a set of the remaining slaves $\{S_{\xi x-n+1}, S_{\xi x-n+2}, \ldots, S_{\xi x}\}$, all the slaves of $\{S_1, S_2, \ldots, S_m\}$ are set in the table circuit 21.

(Step ST4d)

(d) In the case of x=n, the program of the numerical controller 20 first sets the table circuit 21 in the numerical controller so that $S_{\xi 1}$ is transferred in the transfer section $T_1$. Then, the program sets the table circuit 21 so that slave $S_{\xi 2}$ performs transfer of signals in the transfer section $T_2$. Subsequently, moreover, the program sets the table circuit 21 so that slave $S_{\xi 3}$ performs transfer of signals in the transfer section $T_2$. If these setting operations are sequentially repeated up to the transfer section $T_n$, all the slaves are set in the table circuit 21.

(Step ST4*e*)

(e) In the case of x<n, the program of the numerical controller 20 first sets the table circuit 21 in the numerical controller so that slave $S_{g1}$ performs transfer of signals in the transfer section $T_1$. Then, the program sets the table circuit 21 so that slave $S_{g2}$ performs transfer of signals in the transfer section $T_2$. Subsequently, moreover, the program sets the table circuit 21 so that slave $S_{g3}$ performs transfer of signals in the transfer section $T_2$. If these setting operations are sequentially repeated up to the transfer section $T_x$, all the slaves are set in the table circuit 21.

In the processing in Step ST2 to Steps ST4*a* to ST4*e*, an "automatic setting unit" in the numerical controller automatically performs the setting of an "I/O unit transfer order setting unit", based on contents set by the "I/O unit transfer period group setting unit". This "automatic setting unit" sets the I/O units to which DI/DO signals are transferred in the "I/O unit transfer order setting unit", based on order information on the I/O units according to the distance from the numerical controller.

The invention claimed is:

1. A numerical controller for communication with I/O units, wherein the numerical controller is chain-connected with the I/O units so that it transmits DI/DO signals to and receives DI/DO signals from the I/O units by master-slave communication, the numerical controller comprising:
    a timer circuit configured to generate a signal every predetermined period;
    a counter unit configured to count the number of signals generated by the timer circuit up to a predetermined number;
    an I/O unit transfer order setting unit configured to set, from among the I/O units, an I/O unit with which transfer of the DI/DO signals is to be performed for each count value of the counter unit;
    an I/O unit transfer period group setting unit configured to divide the I/O units into groups according to the transfer period of the DI/DO signals; and
    an automatic setting unit configured to automatically perform the setting of the I/O unit transfer order setting unit, based on contents set by the I/O unit transfer period group setting unit;
    wherein the DI/DO signals of the I/O units set in the I/O unit transfer order setting unit are transferred according to the count value of the counter unit,
    wherein information set in the I/O unit transfer period group setting unit comprises order information of the I/O units according to a distance from the numerical controller, and
    wherein the automatic setting unit sets the I/O units to which the DI/DO signals are transferred in the I/O unit transfer order setting unit, based on the order information.

* * * * *